United States Patent [19]

Gondek

[11] 3,957,086

[45] May 18, 1976

[54] CORROSION RESISTANT TUBING

[75] Inventor: Stanley F. Gondek, Troy, Mich.

[73] Assignee: Bundy Corporation, Detroit, Mich.

[22] Filed: Oct. 31, 1974

[21] Appl. No.: 519,425

Related U.S. Application Data

[62] Division of Ser. No. 374,883, June 29, 1973, Pat. No. 3,875,027.

[52] U.S. Cl. .............................. 138/145; 29/183.5; 29/191; 29/196.3; 29/196.6

[51] Int. Cl.² ........................................ B32B 15/00

[58] Field of Search ............... 29/183.5, 191, 196.3, 29/196.6; 138/143, 145, 146; 427/405, 433; 204/38 S

[56] References Cited

UNITED STATES PATENTS

| 626,994 | 6/1899 | Francis | 204/38 S |
|---|---|---|---|
| 1,930,191 | 10/1933 | Bundy | 138/145 |
| 2,371,725 | 3/1945 | Young | 204/38 S X |
| 2,635,020 | 4/1953 | Beebe, Jr. | 29/196.3 |
| 2,647,304 | 8/1953 | Cook et al. | 29/196.6 X |
| 3,644,105 | 2/1972 | Selker et al. | 29/196.3 |
| 3,730,758 | 5/1973 | Laidman | 204/38 S X |

FOREIGN PATENTS OR APPLICATIONS

| 454,415 | 9/1936 | United Kingdom | 204/38 S |

*Primary Examiner*—Arthur J. Steiner
*Attorney, Agent, or Firm*—Harness, Dickey & Pierce

[57] ABSTRACT

Ferrous metal is provided with a corrosion resistant coating having a surprisingly great ability to retard the formation of rust when subjected to salt spray testing. Successive thin layers of copper and nickel are electroplated on steel tubing after which the tubing is terne coated by hot immersion. The corrosion resistance which is achieved by this combination of layers greatly exceeds the sum of the corrosion resistance of each layer when used alone.

9 Claims, 6 Drawing Figures

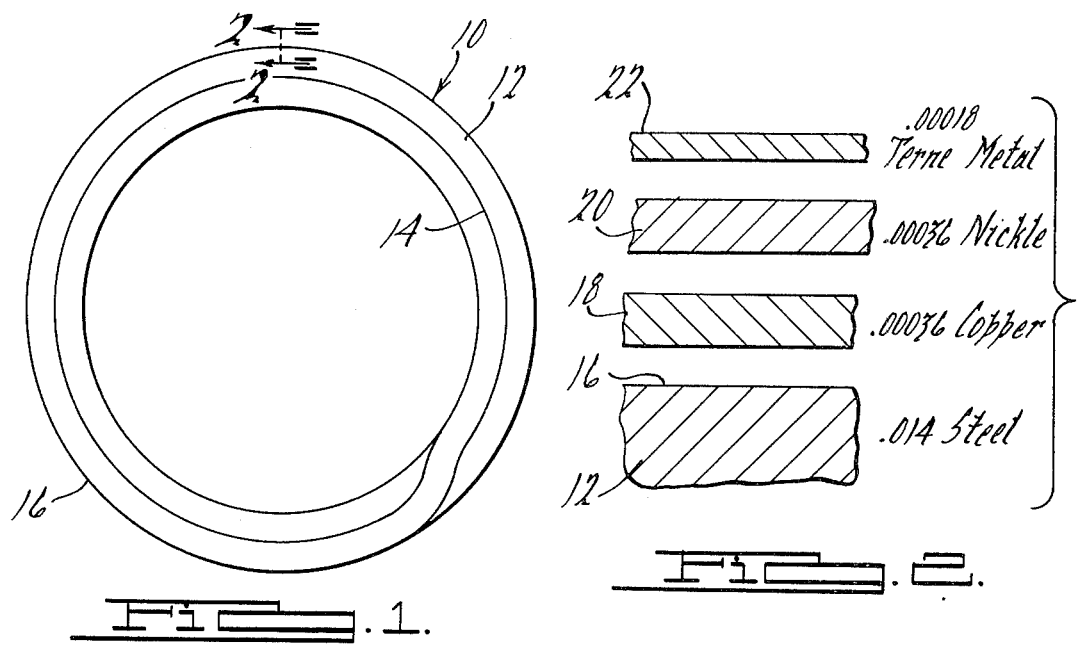
FIG. 1.
FIG. 2.
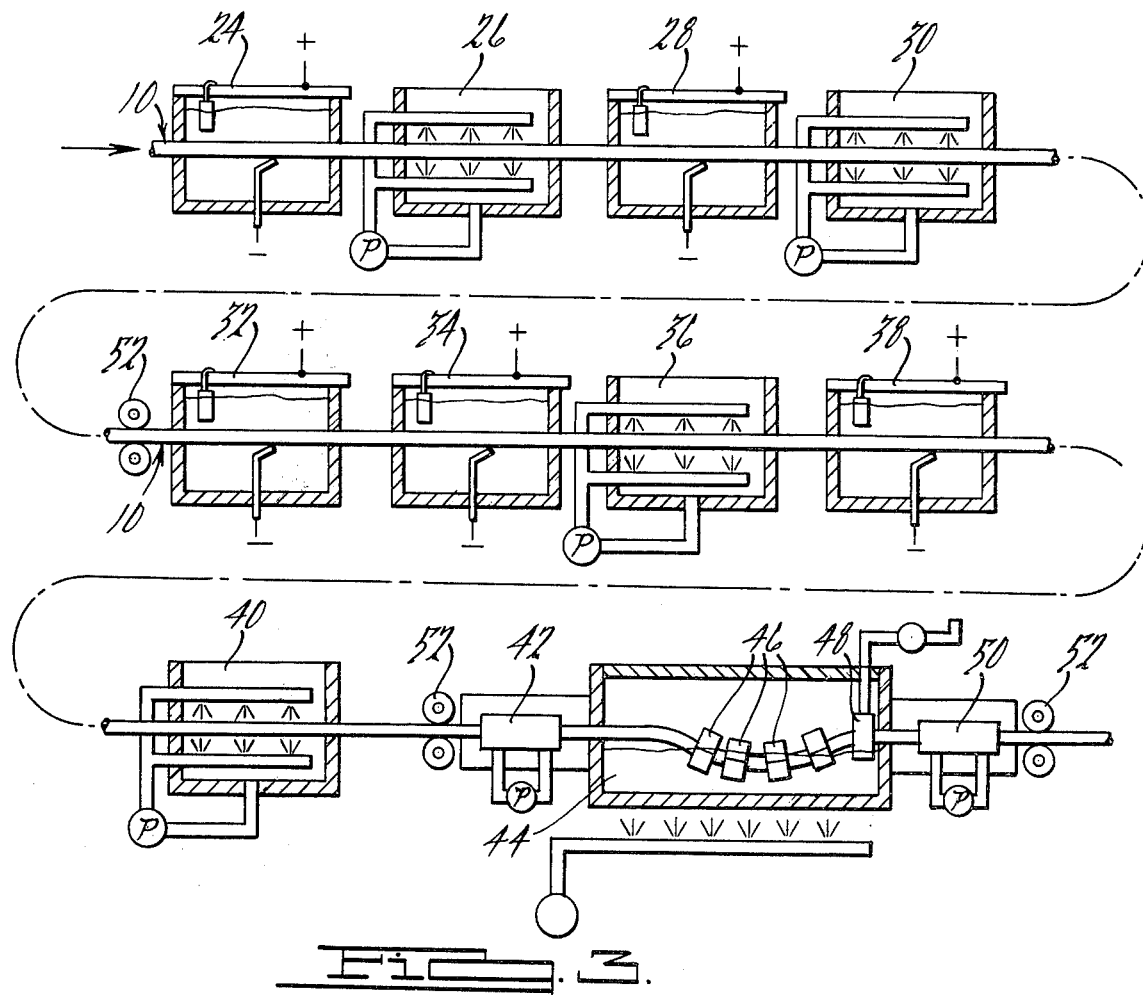
FIG. 3.

CORROSION RESISTANT TUBING

This is a division of application Ser. No. 374,883, filed June 29, 1973, now U.S. Pat. No. 3,875,027.

SUMMARY OF THE INVENTION

Steel tubing is used on automobiles in various locations where it is exposed to road salt and other corrosive elements. For example, copper brazed steel tubing of the general type shown in Bundy U.S. Pat. No. 1,431,368 has been used for automobile hydraulic brake lines for approximately 40 years. Such copper brazed steel tubing and other forms of steel tubing are also used for automobile fuel lines. Both brake and fuel lines extend through exposed locations on the underbody of the car where they come into contact with water, road salt and other elements which accelerate their corrosion. It has been customary to apply a terne coating of tin-lead alloy to steel tubing used on automobiles to inhibit the corrosion of the tubing. The terne coating is customarily applied by passage of the tubing through a bath of tin-lead alloy which is maintained at a temperature of 700°–750°F. Various improvements in terne coating techniques have been developed which have increased the thickness of terne coating which can be applied to the tubing. Nevertheless, terne coated steel tubing will begin to rust after about 24–72 hours of standard salt spray testing. The inception of visible rust may be regarded as the beginning of the gradual structural breakdown of the tube wall. Modern automotive safety requirements have created a demand for tubing capable of longer exposure to a corrosive environment before showing rust.

Various techniques for improving the corrosion resistance of steel tubing have been proposed. For example, copper brazed tubing has been made from a special laminate in which a layer of stainless steel is sandwiched between two layers of low carbon steel. However, such special laminated materials are extremely expensive. Furthermore, the outer low carbon steel layer will still exhibit early signs of rust in the same manner as steel tubing made in the conventional manner. Such tubing is, therefore, not subject to visible inspection to estimate its soundness. Visual inspection for rust is the most convenient and usable method of inspecting steel tubing once it has been placed in use.

Still other proposals have been made for coating steel tubing with materials which are well known for their corrosion resistance. For example, steel tubing electroplated with thin layers of copper and nickel up to 0.001 inch in total thickness gave erratic and unpredictable results when the tubing was subjected to salt spray testing. Very few of a number of tested samples survived 72 hours of salt spray testing without showing rust. While increasing the thickness of a copper or a nickel coating on a steel tubing will increase the corrosion resistance roughly in proportion to thickness of the applied coating, electroplated metal coatings are quite expensive, the amount of the cost varying almost in direct proportion to the thickness of the coating.

Tests have been conducted on tubing made from steel clad with monel and other corrosion resistant alloys. Such tests have generally not been successful. The presence of a nickel alloy on the outer surface of the steel makes it impossible or difficult to furnace braze such tubing. Electrical resistance brazing, on the other hand, is slow, costly, and has generated undesired contaminates on the interior of tubing made from monel clad steel. Butt welding tubing from such materials destroys the cladding at the seams, and exposes the steel substrate to corrosion. Most importantly, however, such clad materials are extremely expensive and tubing made from them has not been sufficiently competitive in price to be of great interest.

The replacement of steel tubing with tubing made from non-ferrous materials has a number of drawbacks. Steel tubing possesses great structural strength, is low in cost, has a proven high reliability, and a substantial body of knowledge exists with respect to the fabrication of steel tubing into various shapes. Copper, on the other hand, is more expensive, is lower in strength and is frequently in short supply. With respect to tubing intended for automobile use, copper has the further detriment of impairing the scrap value of a car. Nickel and nickel-rich alloys are so much more expensive than steel as to be virtually noncomparable to steel tubing. It will, therefore, be apparent that a low cost means of providing a substantial improvement in the ability of steel tubing to withstand corrosion is of substantial importance, particularly to the automotive industry.

The present invention is characterized by the discovery that a terne coating of conventional composition applied in the molten condition over a relatively thin primary coating of copper and/or nickel electrodeposited on ferrous substrate will give the substrate a surprisingly high degree of corrosion resistance. Sample lengths of copper brazed steel tubing which were first given a 0.0005–0.0015 inch total coating comprising electroplated layers of both copper and nickel and thereafter passed through a hot terne alloy bath were found to withstand 3,000–4,000 hours of salt spray testing before exhibiting rust. The surprisinly high degree of corrosion resistance of such a thin and economically practical combination of coatings was completely unexpected. The terne coating may be applied over a primary coating consisting of copper or nickel alone, but the best results were obtained when using a primary coating consisting of a copper layer followed by a layer of nickel.

The corrosion resistant coating of the present invention has been developed in connection with steel tubing. However, the coating and method of this invention is equally applicable to other forms of ferrous substrates.

DESCRIPTION OF THE VIEWS OF THE DRAWINGS

FIG. 1 is a cross sectional view of typical tubing to which the corrosion resistant coating of the present invention is applied;

FIG. 2 is an enlarged exploded sectional view of the structure shown in FIG. 1, taken along the line 2—2 thereof, showing the coating layers which are applied according to one embodiment of the present invention;

FIG. 3 is a schematic view showing one preferred processing of tubing made in accordance with the present invention.

DETAILED DESCRIPTION OF PREFERRED EMBODIMENTS

Figure 4:
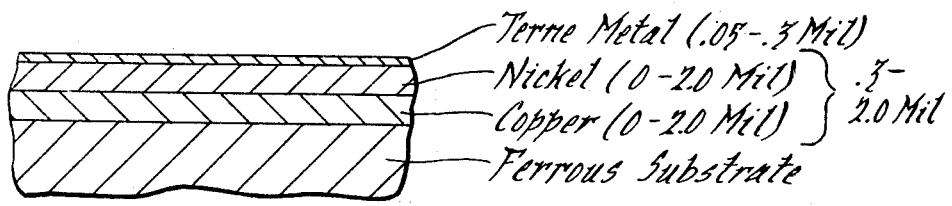
FIGS. 4, 5 and 6 are diagrams showing different combinations of layers applied to a ferrous substrate in accordance with the present invention.

FIG. 1 illustrates the cross sectional shape of a typical copper brazed steel tube 10 used for automotive brake lines and to which the corrosion inhibiting coating of the present invention has been applied. The tube 10 is made from a steel strip 12 having a nominal 0.00015 inch thick copper plating on both surfaces. The strip 12 is preferably made from a low carbon steel such as AISI-1008 steel. The strip 12 is rolled twice around laterally into the double walled configuration illustrated in FIG. 1 and is then furnaced brazed to cause the copper plating to form a copper joint 14 between the overlapping portions of the strip 12. Some of the copper which is plated onto the strip 12 prior to rolling and brazing remains on the outer peripheral surface 16 of the strip 12 although the uniformity of thickness of this coating is impaired by the brazing. Furthermore, the brazing causes some diffusion of copper into the steel.

It has heretofore been common practice to pass the tube 10 through a hot terne alloy bath to terne coat the tube outer surface 16. The terne metal consists of 5–25% tin and the balance lead. It is preferred to use a terne metal having about 15% tin. Typically, the quantity of the terne coating which is applied to the tube 10 according to current commercial practice is about 0.16 ounce per square foot of the area of the surface 16. The thickness of this coating is approximately 0.18 mil. Such terne coated copper brazed steel tubing is typically able to withstand about 24 to 72 hours of standard salt spray testing before exhibiting rust on its outer surface. Modern automotive safety requirements have, however, created a need for tubing which will endure substantially longer periods of salt spray testing without beginning to rust.

In an effort to find a tubing having substantially improved corrosion resistance, a number of specimens of copper brazed steel tubing were electroplated with varying thicknesses of copper and nickel. The total thickness of material electroplated on each specimen never exceeded 0.002 inches. When such plated tubes were subjected to salt spray testing, they gave results which were roughly equivalent to terne coated steel tubing. During one initial test lot none of the tubes survived 72 hours of salt spray testing without rusting and most of the tubes showed rust after only 24 hours. Despite such poor results, it was decided to test a series of tubes which were first copper plated and then nickel plated in accordance with thirteen different electroplating procedures. The procedures differed from one another principally in the preparatory cleaning steps and in the use of "strike" or flash plating baths before the main plating baths in some of the procedures. Twenty-five tubes, 8 inches long having a 3/16 inch outer diameter and a 0.028 wall thickness were used in this test series. One of the tubes was also terne coated after it was electroplated. All 25 tubes were then subjected to a standard salt spray test. The results of this test as well as thicknesses of copper and nickel electroplating on the tested tubes can be found in Table I. One-half of the total electroplated coating of each sample was copper with the other half consisting of nickel applied over the copper.

TABLE I

| Tube No. | Process | Total Cu-Ni Electroplating Thickness | Terne Coated | Hours Until Rust |
|---|---|---|---|---|
| 367 | 1 | 0.00076" | No | 48 |
| 368 | 1 | 0.00070" | No | 72 |
| 369 | 2 | 0.00048" | No | 48 |
| 370 | 2 | 0.00048" | No | 48 |
| 371 | 3 | 0.00087" | No | 48 |
| 372 | 3 | 0.00087" | No | 139 |

TABLE I-continued

| Tube No. | Process | Total Cu-Ni Electroplating Thickness | Terne Coated | Hours Until Rust |
|---|---|---|---|---|
| 373 | 4 | 0.00130" | No | 211 |
| 374 | 4 | 0.00083" | No | 72 |
| 375 | 5 | 0.00072" | Yes | 4,776 |
| 376 | 5 | 0.00077" | No | 72 |
| 377 | 6 | 0.00097" | No | 72 |
| 378 | 6 | 0.00100" | No | 72 |
| 379 | 7 | 0.00073" | No | 139 |
| 380 | 7 | 0.00063" | No | 48 |
| 381 | 8 | 0.00076" | No | 48 |
| 382 | 8 | 0.00138" | No | 72 |
| 383 | 9 | 0.00172" | No | 48 |
| 384 | 9 | 0.00077" | No | 48 |
| 385 | 10 | 0.00097" | No | 48 |
| 386 | 10 | 0.00097" | No | 72 |
| 387 | 11 | 0.00042" | No | 48 |
| 388 | 11 | 0.00045" | No | 72 |
| 389 | 12 | 0.00100" | No | 72 |
| 390 | 12 | 0.00100" | No | 139 |
| 391 | 13 | 0.00030" | No | 48 |

While some improvement was noted for a few of the tubes in the test, no one electroplating procedure was found to give superior results on both of the tubes electroplated by the same procedure, nor "outstanding" results on either of the tubes for which is was used. However, the one tube which was dipped in hot terne alloy after being electroplated with first copper and then nickel gave unbelievably outstanding results.

The result shown in Table I for tube No. 375 (the only tube which was terne coated after being electroplated) was completely unexpected and surprising.

In view of the results achieved with tube No. 375, a second test series was arranged comparing the results of applying, or not applying, terne coating over a primary electroplated coating of varying thickness. This test was also designed to evaluate different combinations of layers making up the primary electroplated coating. The results of this further test are given in Table II and they confirm the fact that greatly improved corrosion resistance for a steel substrate can be obtained by the combination of a relatively thin electroplated primary coating followed by a secondary terne coating applied by the hot dip process.

TABLE II

| Tube No. | Electroplated Copper | Electroplated Nickel | Total Plate | Terne Coated | Hours Until Rust |
|---|---|---|---|---|---|
| 458 | 0.00035" | 0.00035" | 0.00070" | No | 24 |
| 461 | 0.00035" | 0.00035" | 0.00070" | Yes | 2,210 |
| 459 | 0.000375" | 0.000375" | 0.00075" | No | 24 |
| 460 | 0.000375" | 0.000375" | 0.00075" | Yes | 1,970 |
| 446 | 0.000375" | 0.000375" | 0.00075" | No | 24 |
| 447 | 0.000375" | 0.000375" | 0.00075" | Yes | 1,970 |
| 448 | 0.00050" | 0.00050" | 0.001" | No | 96 |
| 449 | 0.00035" | 0.00035" | 0.00070" | Yes | 1,682 |
| 454 | 0.000375" | 0.000375" | 0.00075" | No | 24 |
| 455 | 0.000375" | 0.000375" | 0.00075" | Yes | 3,143 |
| 456 | 0.00050" | 0.00050" | 0.001" | No | 24 |
| 457 | 0.00050" | 0.00050" | 0.001" | Yes | 3,143 |
| 462 | — | 0.00075" | 0.00075" | No | 72 |
| 463 | — | 0.00015" | 0.00015" | Yes | 552 |
| 464 | — | 0.00075" | 0.00075" | Yes | 1,178 |
| 465 | 0.00040" | — | 0.00040" | No | 24 |
| 466 | 0.00040" | — | 0.00040" | No | 24 |
| 467 | 0.00040" | — | 0.00040" | Yes | 3,143 |
| 468 | 0.00045" | 0.00045" | 0.00090" | No | 24 |
| 469 | 0.00045" | 0.00045" | 0.00090" | Yes | 3,143 |
| 470 | 0.00075" | 0.00075" | 0.00150" | No | 24 |
| 471 | 0.00075" | 0.00075" | 0.00150" | Yes | 4,775 |
| 423 | 0.000275" | 0.000275" | 0.00055" | No | 24 |
| 424 | 0.000275" | 0.000275" | 0.00055" | Yes | 3,791 |
| 422 | 0.000375" | 0.000375" | 0.00075" | No | 24 |
| 425 | 0.000375" | 0.000375" | 0.00075" | Yes | 6,279+ |
| 450 | 0.00020" | 0.00020" | 0.00040" | No | 24 |

TABLE II-continued

| Tube No. | Electro-plated Copper | Electro-plated Nickel | Total Plate | Terne Coated | Hours Until Rust |
|---|---|---|---|---|---|
| 452 | 0.00040" | 0.00040" | 0.00080" | No | 24 |
| 453 | 0.00040" | 0.00040" | 0.00080" | Yes | 1,682 |
| 451 | 0.00040" | 0.00040" | 0.00080" | Yes | 3,143 |

+test continuing — no rust visible

Still further tests were conducted in which a third metal was electroplated on the tube prior to hot terne application. By way of example, four tubes in this test were given the following layers of primary electroplating: 0.00017 inch copper, 0.00024 inch nickel and 0.00013 inch tin. The tubes were then terne coated by the hot application process. The thickness of the terne coating was approximately 0.00018 inch. These sample tubes endured between 840 and 1008 hours of salt spray testing before beginning to rust.

In still another test series 91 sample tubes of the type described in FIG. 1 were electroplated and all were passed through a hot terne alloy to determine how thin a primary electroplated coating could be utilized satisfactorily to achieve the improvement which characterizes this invention. This test series is reported in Table III.

TABLE III

| Tube No. | Electroplated Copper | Electroplated Nickel | Electroplated Copper | Total Plate | Hours Until Rust |
|---|---|---|---|---|---|
| 565 | 0.00017" | — | — | 0.00017" | 144 |
| 566 | 0.00017" | — | — | 0.00017" | 312 |
| 567 | 0.00017" | — | — | 0.00017" | 144 |
| 568 | 0.00023" | — | — | 0.00023" | 360 |
| 569 | 0.00023" | — | — | 0.00023" | 552 |
| 570 | 0.00023" | — | — | 0.00023" | 144 |
| 571 | 0.00023" | — | — | 0.00023" | 360 |
| 561 | 0.00040" | — | — | 0.00040" | 552 |
| 562 | 0.00040" | — | — | 0.00040" | 888 |
| 563 | 0.00040" | — | — | 0.00040" | 816 |
| 540 | 0.00045" | — | — | 0.00045" | 888 |
| 541 | 0.00045" | — | — | 0.00045" | 1,488 |
| 542 | 0.00045" | — | — | 0.00045" | 672 |
| 543 | 0.00045" | — | — | 0.00045" | 888 |
| 604 | 0.00075" | — | — | 0.00075" | 1,104 |
| 607 | 0.00075" | — | — | 0.00075" | 1,104 |
| 605 | 0.00085" | — | — | 0.00085" | 2,280 |
| 606 | 0.00085" | — | — | 0.00085" | 408 |
| 558 | — | 0.00022" | — | 0.00022" | 144 |
| 572 | — | 0.00022" | — | 0.00022" | 384 |
| 575 | — | 0.00022" | — | 0.00022" | 216 |
| 574 | — | 0.00022" | — | 0.00022" | 24 |
| 551 | — | 0.00040" | — | 0.00040" | 480 |
| 544 | — | 0.00040" | — | 0.00040" | 480 |
| 545 | — | 0.00040" | — | 0.00040" | 672 |
| 550 | — | 0.00050" | — | 0.00050" | 816 |
| 546 | — | 0.00050" | — | 0.00050" | 816 |
| 547 | — | 0.00050" | — | 0.00050" | 672 |
| 557 | — | 0.00017" | — | 0.00017" | 408 |
| 548 | — | 0.00017" | — | 0.00017" | 216 |
| 549 | — | 0.00017" | — | 0.00017" | 672 |
| 578 | 50% | 50% | — | 0.00033" | 144 |
| 584 | 50% | 50% | — | 0.00033" | 840 |
| 585 | 50% | 50% | — | 0.00033" | 888 |
| 586 | 50% | 50% | — | 0.00033" | 1,104 |
| 577 | 50% | 50% | — | 0.00045" | 528 |
| 580 | 50% | 50% | — | 0.00045" | 528 |
| 582 | 50% | 50% | — | 0.00045" | 1,104 |
| 576 | 50% | 50% | — | 0.00053" | 888 |
| 581 | 50% | 50% | — | 0.00053" | 888 |
| 602 | 50% | 50% | — | 0.00053" | 1,848 |
| 583 | 50% | 50% | — | 0.00060" | 888 |
| 601 | 50% | 50% | — | 0.00060" | 888 |
| 587 | 50% | 50% | — | 0.00070" | 888 |
| 600 | 50% | 50% | — | 0.00070" | 1,488 |
| 588 | — | 50% | 50% | 0.00035" | 312 |
| 593 | — | 50% | 50% | 0.00035" | 360 |
| 594 | — | 50% | 50% | 0.00035" | 672 |
| 589 | — | 50% | 50% | 0.00045" | 1,488 |
| 596 | — | 50% | 50% | 0.00045" | 888 |
| 598 | — | 50% | 50% | 0.00045" | 672 |
| 590 | — | 50% | 50% | 0.00050" | 672 |
| 592 | — | 50% | 50% | 0.00050" | Lost |
| 595 | — | 50% | 50% | 0.00050" | 408 |
| 597 | — | 50% | 50% | 0.00050" | 528 |
| 591 | — | 50% | 50% | 0.00060" | 1,104 |
| 599 | — | 50% | 50% | 0.00060" | 888 |
| 624 | 50% | 50% | — | 0.00030" | 984 |
| 625 | 50% | 50% | — | 0.00030" | 216 |
| 626 | 50% | 50% | — | 0.00030" | 360 |
| 627 | 50% | 50% | — | 0.00030" | 480 |
| 617 | 50% | 50% | — | 0.00045" | 1,488 |
| 621 | 50% | 50% | — | 0.00045" | 1,104 |
| 622 | 50% | 50% | — | 0.00045" | 1,104 |
| 623 | 50% | 50% | — | 0.00045" | 888 |
| 612 | 50% | 50% | — | 0.00070" | 1,488 |
| 613 | 50% | 50% | — | 0.00070" | 2,280 |
| 616 | 50% | 50% | — | 0.00070" | 672 |
| 614 | 50% | 50% | — | 0.00080" | 1,848 |
| 615 | 50% | 50% | — | 0.00080" | 1,488 |
| 618 | 50% | 50% | — | 0.00080" | 1,488 |

TABLE III-continued

| Tube No. | Electroplated Copper | Electroplated Nickel | Electroplated Copper | Total Plate | Hours Until Rust |
| --- | --- | --- | --- | --- | --- |
| 645 | — | 0.00021" | — | 0.00021" | 360 |
| 646 | — | 0.00021" | — | 0.00021" | 48 |
| 647 | — | 0.00021" | — | 0.00021" | 168 |
| 653 | — | 0.00049" | — | 0.00049" | 528 |
| 654 | — | 0.00049" | — | 0.00049" | 672 |
| 655 | — | 0.00049" | — | 0.00049" | 528 |
| 648 | — | 0.00061" | — | 0.00061" | 528 |
| 649 | — | 0.00061" | — | 0.00061" | 528 |
| 629 | 0.00020" | — | — | 0.00020" | 72 |
| 630 | 0.00020" | — | — | 0.00020" | 72 |
| 631 | 0.00020" | — | — | 0.00020" | 216 |
| 632 | 0.00032" | — | — | 0.00032" | 360 |
| 633 | 0.00032" | — | — | 0.00032" | 672 |
| 635 | 0.00032" | — | — | 0.00032" | 360 |
| 636 | 0.00060" | — | — | 0.00060" | 1,032 |
| 638 | 0.00060" | — | — | 0.00060" | 672 |
| 637 | 0.00065" | — | — | 0.00065" | 528 |
| 639 | 0.00065" | — | — | 0.00065" | 1,032 |
| 640 | 0.00075" | — | — | 0.00075" | 528 |
| 642 | 0.00075" | — | — | 0.00075" | 48 |
| 643 | 0.00075" | — | — | 0.00075" | 528 |

While the total hours of salt spray testing without rust reported in Table III are not as favorable as the terne coated samples of Table I and II (even in the case of samples plated to the same thickness as the samples of Tables I and II), consistently high corrosion resistance was experienced when the total electroplated coating thickness was at least 0.0004 inch thick. Only one sample tube having a primary coating greater than this thickness (e.g., tube No. 642) failed to give outstanding results when compared to electroplated tubes that were not terne coated. While isolated anomalous results are frequently obtained in "endurance" or longevity type testing, tube No. 642 probably had a surface or seam defect which accounted for its poor performance. The difference in the general level of results reported in Table III as compared with those of Table II may result from unintentional differences in the processing of the samples. In any event, the results of Table III would indicate that an electroplated primary coating covered with a secondary hot applied terne coating will give consistently superior results when the primary coating is at least 0.0004 inch thick. In the case of primary coatings consisting of nickel over electroplated copper, as thin a coating as 0.0003 inch appeared to give greatly improved results. The most consistently superior results, however, were achieved when the electroplated primary coating was of a minimum thickness of 0.0007 inch.

Figure 5:
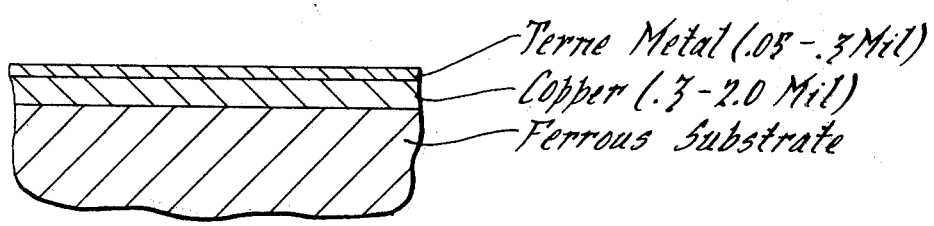
Figure 6:
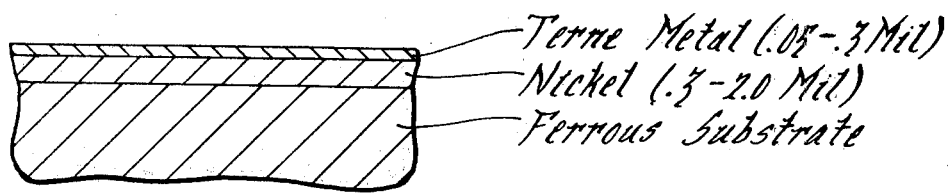

In all samples tested the total electroplated coating did not exceed 0.002 inch in thickness. Electroplated nickel coatings of 0.003–0.005 inch thick over copper, for example, are typical when superior corrosion resistance is desired. However, the cost of applying such a thick coating of nickel or other expensive metal to steel tubing would make the cost of the entire tubing so high as to be undesirable. Accordingly, all experiments were conducted with relatively thin electroplated layers of not more than 0.002 inch in total thickness. The present invention is distinguished by the discovery that a relatively thin plating of nickel and/or copper can be made highly effective in protecting a steel substrate from corrosion when covered by a terne metal applied molten. Accordingly, the present invention contemplates the use of a primary coating consisting of one or more electroplated layers composed principally of nickel and/or copper. The thicknesses of such primary coating is broadly within the range of about 0.0004–0.0019 inch and preferably 0.0007–0.0015 inch in thickness. While the primary coating may be applied in one layer or several layers, it preferably includes a layer of nickel applied over a layer of copper, in which case the total primary coating thickness may be as thin as 0.0003 inch. The present invention further contemplates the use of a secondary coating terne metal which is applied by passage through molten terne, the thickness of the terne coating being broadly in the range of 0.05–0.30 mil and preferably 0.15–0.25 mil in thickness. Coatings in these ranges are shown in FIGS. 4, 5 and 6.

FIG. 2 shows in exploded form a typical arrangement of coating layers applied to the tube outer surface 16 in accordance with one form of the present invention. This particular combination of layers corresponds to sample tube No. 375 of Table I. As will be seen from FIG. 2, a 0.00036 inch thick layer of copper 18 is electroplated on the surface 16 and a 0.00036 inch thick layer of nickel 20 is electroplated over the copper 18. The tube 10 is then passed through a hot terne metal bath to produce a 0.00018 inch thick layer of terne metal 22 over the nickel 20. The copper 18 and nickel 20 comprise two layers of what may be termed a primary electroplated coating while the terne metal 22 comprises a secondary coating overlying the primary coating.

FIG. 3 schematically illustrates one method for continuously processing a tube 10 (or a plurality of such tubes) to produce the coatings of FIG. 2. Copper brazed steel tubing is frequently made in long lengths of approximately 100 feet. A plurality of tubes of such lengths may be processed in side by side relation through the apparatus of FIG. 3. It is also possible to join tubes end to end to produce an endless tube. In any case, the ends of the tubes 10 are crimped or otherwise sealed to exclude processing chemicals and other foreign matter from the tube interior.

According to the apparatus of FIG. 3, one or more tubes 10 are advanced successively through a cathodic cleaning bath 24 containing sodium hydroxide and sodium cyanide, a wash bath 26, a cathodic cleaning bath 28 of sulfuric acid, a water wash bath 30, a copper strike bath 32, a copper electroplating bath 34, a water wash bath 36, a nickel electroplating bath 38 and a water wash bath 40. The tube 10 is then fed into terne coating apparatus including a hydrochloric acid cleaner 42 and a hot terne metal bath 44 through which the tube 10 is directed by guide castings 46. After leaving the terne metal bath 44, the tube 10 passes through a pneumatic wiper or air die 48 to control the thickness and uniformity of terne metal applied thereto, after which the terne metal coating on the tube 10 is chilled by the passage of the tube through a water bath 50. Various pairs of drive rollers 52 advance the tube 10 through the apparatus of FIG. 3.

While all of the sample tubes referred to in Tables I, II and III were processed by hand to apply the electroplated coating(s) and not in continuous apparatus such as illustrated in FIG. 3, except for the hot terne coating, the sequence of processing steps described in connection with FIG. 3 corresponds to Process No. 5 utilized in the preparation of many of the experimental tubes including tube No. 375. In the processing of tube No. 375, the chemicals, times, currents and temperatures in the steps corresponding to the cathodic cleaning bath 24, the cathodic cleaning bath 28 and the copper strike bath 32 were as follows:

Sodium Hydroxide — Sodium Cyanide
Cathodic Cleaning Bath (22)

| | | |
|---|---|---|
| Sodium Hydroxide | 200 gm/l | |
| Sodium Cyanide | 6 gm/l | |
| Room Temperature | | |
| Current per tube | 3.75 amps | 4 Volts |
| Time | 15 seconds | |

Sulfuric Acid Cathodic Cleaning Bath (24)

| | | |
|---|---|---|
| 10% Sulfuric Acid | | |
| Room Temperature | | |
| Current | 2.5 amps | 3 Volts |
| Time | 15 seconds | |

Copper Strike Bath (32)

| | | |
|---|---|---|
| Copper Cyanide | 15.0 gm/l | |
| Sodium Cyanide | 27.5 gm/l | |
| Temperature | 120° F | |
| Current per tube | 2.5 amps | 3 Volts |
| Time | 15 seconds | |

Process No. 4 of Table I, which was used to prepare many of the tubes of Tables II and III also appeared to be desirable. The steps were as follows:

PROCESS No. 4

See Tubes No. 373 and No. 374

1. Cathodic Cleaning: Sodium Hydroxide, Sodium Cyanide
2. Wash
3. Nickel Strike
4. Wash
5. Copper Strike
6. Copper Plate
7. Wash
8. Nickel Strike
9. Wash
10. Nickel Plate
11. Wash It should be mentioned that during salt spray testing of tubes a "pin hole" rust spot may appear on a tube. The point at which the appearance of a pin hole rust spot occurs is noted. If the spot continues to grow, the point in time at which its inception was noticed is regarded as the inception of rust. If, however, a pin hole rust spot does not grow, but remains static, this is not regarded as the inception of rust as it probably resulted from a small ferrous particle occluded in the coating and not from the substrate. Rust from such small occlusions later may disappear entirely during the testing.

All of the salt spray tests referred to herein consisted of standard American Society of Testing and materials neutral 5% salt spray tests. This type of test is covered by ASTM Designation: B117-64.

The reasons for the exceptional results achieved with the particular combination of primary and secondary coatings described herein are not fully understood. It is thought that the electroplated coating provides a surface for the terne coating which enables terne coating to be applied with greater uniformity and tenacity than was previously possible. Viewed somewhat differently, it may be that such thin electroplated coatings by themselves have a certain amount of porosity which subjects them to corrosive attack. When the terne metal is applied, the pores are filled to produce a combined coating which is non-porous and of great uniformity.

The cost of producing copper brazed steel tubing coated in accordance with the present invention is believed to be about 50% more than the cost of producing the same tubing which is terne coated only. In analyzing the incremental cost of the electroplating, it is significant to note that copper is currently 2½ to 3 times as expensive as terne metal and nickel is 7½ to 8 times as expensive as terne metal. The cost of applying electroplated layers bears a close proportional relationship to the thickness of the layer electrodeposited. It will, therefore, be apparent that a corrosion coating process which permits the use of such thin layers of nickel and/or copper as are disclosed herein has significant cost advantages over the relatively thick nickel and copper electroplated layers which were heretofore believed necessary in order to achieve any significant degree of corrosion protection for ferrous substrates.

It should be pointed out that the coating described herein need not be in direct contact with the ferrous substrate. It is believed possible to use such coatings over various undercoatings or on steel which has been previously coated. For example, the coating of the present invention may be applied to a previously galvanized steel or a steel to which a preliminary plating of zinc has been applied. In that case, the zinc might perform much of the function of the copper in the previously described copper-nickel combination primary plating.

What is claimed is:

1. A corrosion resistant metallic tubing comprising a steel strip formed into tubular shape and having inner and outer surfaces, a primary protective coating on said outer surface comprising one or more electrodeposited layers selected from the metals copper and nickel, there being no appreciable diffusion of said primary coating into the outer steel surface of said tubular steel strip, said primary coating having an undiffused thickness of between 0.0003 and 0.0019 inches, and a terne metal coating overlying said primary coating.

2. The article set forth in claim 1 in which said primary coating is between 0.0007 and 0.0015 inch in thickness.

3. The article set forth in claim 1 in which said primary coating includes a copper layer lying on said outer surface and a nickel layer lying on said copper layer.

4. The article set forth in claim 1 in which said primary coating includes a copper layer lying on said outer surface and having a thickness of between 0.0002 and 0.0005 inch and a nickel layer lying on said copper layer and having a thickness of between 0.0002 and .0005 inch.

5. A corrosion resistant metallic tubing comprising an elongated steel strip rolled into tubular shape with portions of said strip overlying one another, a copper brazing material bonding said overlying portions together and being at least partially diffused into the steel, a primary protective coating on the outer surface on said tubular steel strip comprising one or more electrodeposited layers selected from the metals copper and nickel, there being no appreciable diffusion of said primary coating into the outer steel surface of said tubular steel strip, said primary coating having an undiffused thickness of between .0003 and .0019 inches, and a terne metal coating overlying said primary coating.

6. The article set forth in claim 5 in which said primary coating is between 0.0007 and 0.0015 inch in thickness.

7. The article set forth in claim 5 in which said primary coating includes a copper layer lying on said outer surface and a nickel layer lying on said copper layer.

8. The article set forth in claim 5 in which said primary coating includes a copper layer lying on said outer surface and having a thickness of between 0.002 and 0.0005 inch and a nickel layer lying on said copper layer and having a thickness of between 0.0002 and 0.0005 inch.

9. The article set forth in claim 5 including residual amounts of copper diffused into said steel outer surface as a result of the brazing process.

* * * * *

UNITED STATES PATENT OFFICE
CERTIFICATE OF CORRECTION

PATENT NO. : 3,957,086
DATED : May 18, 1976
INVENTOR(S) : Stanley F. Gondek

It is certified that error appears in the above-identified patent and that said Letters Patent are hereby corrected as shown below:

Column 7, line 24, "Table" should be --Tables--

Column 12, line 10, "0.002" should be --.0002--

Signed and Sealed this

Thirty-first Day of August 1976

[SEAL]

Attest:

RUTH C. MASON
*Attesting Officer*

C. MARSHALL DANN
*Commissioner of Patents and Trademarks*